UNITED STATES PATENT OFFICE.

FREDERICK W. GRAFF AND JOHN V. OPPEL, OF SAN FRANCISCO, CALIFORNIA.

PROCESS FOR MAKING BEVERAGES.

1,376,870.     Specification of Letters Patent.     Patented May 3, 1921.

No Drawing.     Application filed December 21, 1916. Serial No. 138,226.

*To all whom it may concern:*

Be it known that we, FREDERICK W. GRAFF and JOHN V. OPPEL, citizens of the United States, residing at San Francisco, in the county of San Francisco and State of California, have invented certain new and useful Improvements in Processes for Making Beverages, of which the following is a specification.

Our invention relates to a process for making beverages which is preferably made by fermentation and may be either alcoholic or non-alcoholic.

The object of our invention is to produce an article of manufacture, liquids, beverages and liquors, which contain in addition to the usual contents of such fluids, as fermented sugars of various origin, also extracts of coffee, or cocoa in their original state, or previously deprived of various contents such as fats, caffein, thein, caffeol, caffetanic acid, caffeic acid, etc., or extracts from coffee or cocoa which have been manufactured from coffees or cocoas previously subjected to germination or partial germination in order to furnish the maltose required for fermentation with or without the addition of other fermentable materials, or extracts of substitutes of coffee such as chicory, roasted grains, or the like, said vegetable beverage material being not only added for the purpose of flavoring the mixture, but also acting as a stimulating agency.

Scientific investigations and numerous analyses have shown us that when extracts of such coffees, or cocoas as described above are added to fermentable liquids such as wort, grape juices, fruit juices or any solutions containing sugars fermentable by any yeasts, that the products obtained by such fermentations show very pronounced, desirable flavors, and furthermore, that such fermentation produces a desirable change in the chemical constituents of the original coffee, or cocoa extracts, and also exercises a very beneficial influence upon the action of the yeasts employed, due to the large amounts of potassium and phosphoric acid contained in such extracts.

The process of manufacturing such fermented liquids with the addition of coffee, or cocoa extracts, such liquids to be used in their original states as beverages of an alcoholic nature or made non-alcoholic by the removal of alcohol in any well known way, or by the addition of unfermented liquids of various natures to such fermented liquids in order to reduce the alcoholic contents, is similar to the process now used in breweries, wineries, distilleries or other enterprises fermenting saccharine matter.

Our invention consists of the process carried out by a series of steps in a certain order which will be hereinafter more fully described and particularly pointed out in the appended claim.

We will describe as an instance the preparation of a fermented liquid according to our invention to which coffee extracts for instance have been added, and in order to obtain similar liquids to which cocoa extracts have been added, it is only necessary to make slight changes in the preparation of the extracts from cocoa as compared with coffee. Otherwise, the product and process will remain the same or similar to each other. It will therefore not be necessary to make full descriptions of preparing such beverages to which cocoa extracts have been added in place of coffee extracts.

After the liquids to be fermented for instance wort, have been prepared in well known ways, we add to such worts, either with hops or without hops, such quantities of coffee extracts as we find desirable and necessary for the flavor which we desire to produce, and then ferment this wort with suitable yeast in any well known and suitable manner. After the fermentation is finished the products obtained by such processes are handled in similar ways to the well known processes of breweries, clarified, aged, put in barrels or bottles, are pasteurized or not pasteurized, made sparkling by the addition of more sugar, and further fermented in the bottle or carbonized with carbonic acid, and when finished represent a new beverage with pronounced flavor of highly nutritive and stimulative value for daily consumption as well as for medical purposes. By varying the amounts of coffee or employing coffee of which constituents as mentioned above or others have been removed we are in a position to manufacture a great many varieties of fermented liquids serving different purposes. We may also prepare these extracts of coffee, its substitutes, or cocoa by using the liquids to be fermented such as wort, fruit juices, sugar solutions, or the like, as material of extractions of these coffees, their substitutes, or cocoa.

If the coffee or cocoa is first germinated before roasting, we may ferment the extracts of such green germinated coffees previously prepared similar to malts, then roast the beans which have been previously extracted, or use the fermented extracts of the green beans, either alone or with the addition of the extracts of the roasted beans, which have been germinated and extracted before roasting or use either of these extracts as an addition to the coffee or cocoa extracts manufactured from normally roasted beans. We also may germinate the beans; extract them, ferment the extracts with or without the addition of other saccharine matter suitable for fermentation, evaporate the extracts so obtained to dryness, and roast them by subjecting them to a suitable temperature for such roasting processes, and make suitable solutions from such roasted products, and use them as an addition for other liquids which we desire to subject to fermentation alone or with other coffee or cocoa extracts prepared as described above.

In a similar way as to the addition of wort, we may also add extracts of the various coffees, or cocoas to other saccharine materials suitable for fermentation, such as grape juices, fruit juices, molasses, or solutions containing any saccharine matter suitable for fermentation, and produce from such liquids alcoholic or non-alcoholic beverages, retaining some of the fermentation carbonic acid, or carbonizing them with carbonic acid in any well known way.

In the manufacture of whiskies and brandies we may add to the original saccharine solution to be fermented for distillation purposes, coffee, or cocoa extracts similar as described above, which products of distillation obtained from such fermentation and subsequent distilled liquids excel by very desirable, pronounced and new flavors.

If we desire to use cocoas as an addition to the fermented solution in order to produce beverages, alcoholic or non-alcoholic or products of distillation of such fermented liquids, we add suitable extracts of cocoa in quantities as desired by us to such fermentable liquids, ferment them by using suitable yeasts and proceed as herein described.

As an example of carrying out our invention in which coffee is employed the following materials and steps are followed:—

One pound of coffee is extracted with from one to two gallons of water in any well known way, and to this extract are added from five to twenty-five ounces of sugar. Then a suitable yeast according to the character of the potable mixture to be produced as for instance *Saccharomyces cerevisiæ*, or a wine yeast, such as burgundy is added in quantities from one half to two ounces or more. The mixture is fermented at a suitable temperature. Or a pound of coffee is extracted with one to two gallons of a wort containing from five to twenty-five per cent. of saccharine matter or with the fruit juice or other saccharine solutions and the extract obtained is treated as above.

We wish it also to be distinctly understood that whenever the term "vegetable beverage material" appears throughout the specification and claim, that coffee, or substitutes of coffee such as chicory, roasted grains or the like, or cocoa or substances of similar characteristics is intended to be included within the meaning of said term.

What we claim is:—

The process of making a potable mixture which comprises germinating the green beans of a vegetable beverage such as coffee or cocoa to produce a malt thereof, extracting the malt of said material, fermenting the said malt extract, desiccating the said fermented malt extract, roasting said desiccated malt extract, and fermenting said roasted malt extract.

In testimony whereof we affix our signatures.

FREDERICK W. GRAFF.
JOHN V. OPPEL.